United States Patent
Nakajima (10) Patent No.: US 10,761,260 B2
(45) Date of Patent: Sep. 1, 2020

(54) DISPLAY DEVICE

(71) Applicant: Sharp Kabushiki Kaisha, Sakai, Osaka (JP)

(72) Inventor: Nobuhisa Nakajima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 80 days.

(21) Appl. No.: 16/182,641

(22) Filed: Nov. 7, 2018

(65) Prior Publication Data

US 2019/0146146 A1    May 16, 2019

(30) Foreign Application Priority Data

Nov. 15, 2017    (JP) ................... 2017-220102

(51) Int. Cl.
    *G02F 1/1333*     (2006.01)
    *G02F 1/1335*     (2006.01)
    *F21V 8/00*     (2006.01)

(52) U.S. Cl.
    CPC ......... *G02B 6/0088* (2013.01); *G02B 6/0055* (2013.01); *G02F 1/133308* (2013.01); *G02F 1/133528* (2013.01); *G02F 2001/133314* (2013.01)

(58) Field of Classification Search
None
See application file for complete search history.

(56) References Cited

U.S. PATENT DOCUMENTS

| | | | |
|---|---|---|---|
| 10,267,976 B1 * | 4/2019 | Zheng | G02B 6/0045 |
| 10,586,090 B2 * | 3/2020 | Kim | G06K 9/22 |
| 2014/0219646 A1 * | 8/2014 | Hooton | G03B 15/03 396/176 |
| 2016/0161664 A1 | 6/2016 | Ishida et al. | |
| 2016/0341854 A1 * | 11/2016 | Kidane | G02F 1/133308 |
| 2017/0123140 A1 * | 5/2017 | Han | G02B 6/0055 |
| 2019/0073505 A1 * | 3/2019 | Kwon | G01B 11/24 |
| 2019/0293975 A1 * | 9/2019 | Cheng | G02F 1/1336 |
| 2019/0293976 A1 * | 9/2019 | Cheng | G02F 1/1336 |
| 2019/0306296 A1 * | 10/2019 | Cheng | H04M 1/0266 |
| 2020/0064541 A1 * | 2/2020 | Jeon | G02B 6/0053 |

FOREIGN PATENT DOCUMENTS

WO     2015/022887 A1     2/2015

* cited by examiner

*Primary Examiner* — Leah Simone Macchiarolo
(74) *Attorney, Agent, or Firm* — Keating & Bennett, LLP (57) ABSTRACT

The present invention provides a display device which allows reducing luminance unevenness around a non-display region even in a case where the non-display region is provided in a given position. A liquid crystal display device includes: a liquid crystal panel; a front polarizer and a back polarizer each having a polarizer opening; and a backlight unit having a unit opening. The backlight unit includes: a light guide plate; a light source provided on an end surface of the light guide plate; and edge parts respectively surrounding (i) an outer periphery of the backlight unit and (ii) the unit opening. A reflection member is provided on a portion of an outer peripheral surface of the edge part surrounding the unit opening which portion is on a side opposite to the light source, the reflection member reflecting scattered light which has been scattered by the edge part.

5 Claims, 6 Drawing Sheets

DISPLAY DEVICE

This Nonprovisional application claims priority under 35 U.S.C. § 119 on Patent Application No. 2017-220102 filed in Japan on Nov. 15, 2017, the entire contents of which are hereby incorporated by reference.

TECHNICAL FIELD

The present invention is related to a display device, particularly to a display device which has a display region in a portion of which a non-display region is provided.

BACKGROUND ART

Patent Literature 1 discloses a display device which has a display region in a portion of which a non-display region is provided. The display device of Patent Literature 1 is a display device which uses an edge-lit backlight, and the backlight has an opening corresponding to the non-display region. The display device of Patent Literature 1 allows reducing luminance unevenness around the non-display region.

CITATION LIST

Patent Literature

[Patent Literature 1]
International Publication No. WO2015/022887

SUMMARY OF INVENTION

Technical Problem

However, the display device of Patent Literature 1 is under a limitation that an opening has to be provided in a predetermined position in order to reduce luminance unevenness around the non-display region.

The present invention is accomplished in view of the above problem. An object of the present invention is to provide a display device which allows reducing luminance unevenness around a non-display region even in a case where an opening corresponding to the non-display region is provided in a given position.

Solution to Problem

In order to attain the object, a display device in accordance with one aspect of the present invention is a display device including: a display section including a non-display region; and a backlight unit having a unit opening corresponding to the non-display region, the backlight unit including: a light guide plate; a light source provided on an end surface of the light guide plate; and edge parts respectively surrounding (i) an outer periphery of the backlight unit and (ii) the unit opening, a reflection member being provided on a portion of an outer peripheral surface of the edge part surrounding the unit opening which portion is on a side opposite to the light source, the reflection member reflecting scattered light which has been scattered by the edge part.

Advantageous Effects of Invention

The display device in accordance with the one aspect of the present invention allows an opening corresponding to a non-display region to be provided in a given position without reducing luminance unevenness around the non-display region.

DESCRIPTION OF EMBODIMENTS

Embodiment 1

Figure 1:
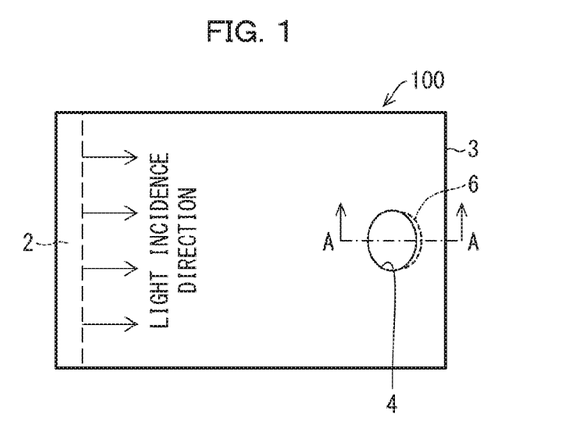
FIG. 1 is a top view schematically illustrating a liquid crystal display device in accordance with Embodiment 1 of the present invention.
Figure 2:
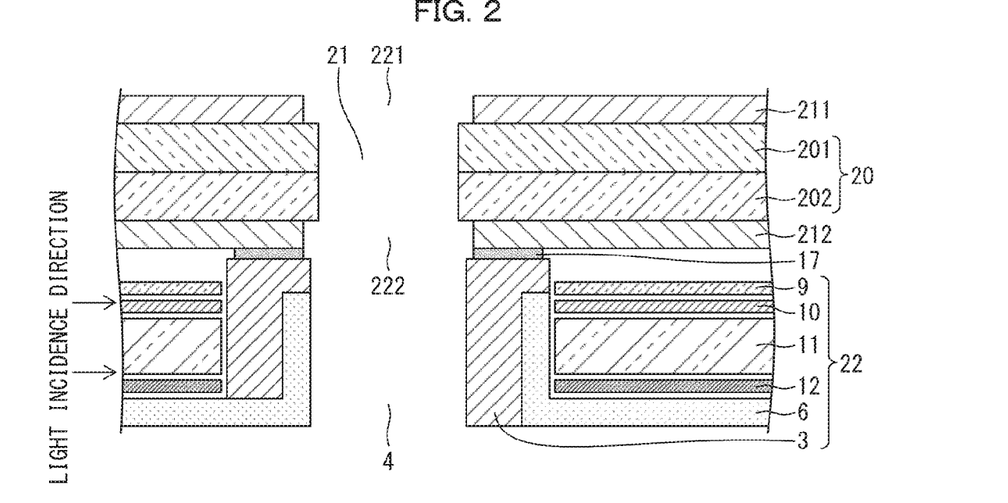
FIG. 2 is a cross-sectional view taken along a line A-A shown in FIG. 1.

The following description will discuss Embodiment 1 of the present invention in detail with reference to FIGS. 1 and 2.

Firstly, FIG. 1 is a top view schematically illustrating a liquid crystal display device (a display device) in accordance with Embodiment 1 of the present invention. FIG. 2 is a cross-sectional view taken along a line A-A shown in FIG. 1.

As illustrated in FIGS. 1 and 2, a liquid crystal display device 100 is constituted by (i) a liquid crystal panel (a display section) 20 constituted by CF glass 201 and TFT glass 202, (ii) front and back polarizers 211, 212 which are provided on a front surface and a back surface, respectively, of the liquid crystal panel 20, and (iii) a backlight unit 22. The liquid crystal display device 100 is a liquid crystal display device such as a smartphone.

The liquid crystal panel 20 includes a display region in which an image (not illustrated) or the like is displayed and a non-display region in which no image or the like is displayed. The front polarizer 211 and the back polarizer 212 have polarizer openings 221, 222 which pass through the front polarizer 211 and the back polarizer 212 in a thickness direction of the front polarizer 211 and the back polarizer 212. The liquid crystal panel 20 has a panel opening 21 which passes through the liquid crystal panel 20 in a thickness direction of the liquid crystal panel 20. The backlight unit 22 has a unit opening 4 which passes through the backlight unit 22 in a thickness direction of the backlight unit 22. Note that the polarizer openings 221, 222, the panel opening 21, and the unit opening 4 each correspond to the non-display region.

The backlight unit 22 has a structure in which a plurality of optical sheets such as a lens sheet 9, a diffusing sheet 10, a light guide plate 11, and a reflection sheet 12 are stacked. The backlight unit 22 includes (i) a light source 2 which is provided on an end surface of the light guide plate 11 and (ii) edge parts 3 which respectively surround (a) an outer periphery of the backlight unit 22 and (b) the unit opening 4. The light source 2 is not limited to a specific one, and can be, for example, an LED or the like. The light guide plate 11 causes light, which has been emitted from the light source 2 and has entered the light guide plate 11 through the end surface of the light guide plate 11, to exit from an exit plane side toward the liquid crystal panel 20. A material of the light guide plate 11 is not particularly limited, but is preferably a resin such as acrylic or polycarbonate from a viewpoint of thickness reduction and weight reduction. The reflection sheet 12 is provided on a side opposite to the light exit plane of the light guide plate 11, and reflects light which has entered a plane in the light guide plate 11 which plane is on the side opposite to the light exit plane. The edge parts 3 are bonded to the back polarizer 212 via a double-sided tape 17.

Inside the unit opening 4, for example, a device such as a CCD camera, an illuminance sensor, and an infrared sensor is provided. Note that a diameter of the unit opening is not particularly limited, and can be adjusted as appropriate in accordance with, for example, a size of the device to be provided inside the unit opening 4.

The edge parts 3 are made of a resin material such as polycarbonate (PC).

On a portion of an outer peripheral surface of the edge part 3 surrounding the unit opening 4 which portion is on a side opposite to the light source 2, a reflection member 6 is provided. In Embodiment 1, the reflection member 6 preferably has a reflectance higher than that of each of the edge parts 3. In Embodiment 1, the reflection member 6 is constituted by a bezel made of a metal such as stainless steel (SUS), but the reflection member 6 is not particularly limited to a specific one provided that the reflection member 6 reflects at least scattered light which has been scattered by the edge part 3.

In the liquid crystal display device 100 having the above-described configuration, light emitted from the light source 2 enters the end surface of the light guide plate 11 so as propagate through the light guide plate 11, and exits from the exit plane side of the light guide plate 11 toward the liquid crystal panel 20. At this time, the reflection member 6 reflects scattered light which has propagated through the light guide plate 11 and has been scattered at the edge part 3. The following description will discuss an advantageous effect of the reflection member 6 with reference to FIG. 3.

Figure 3:
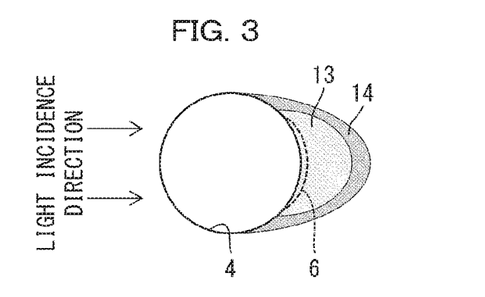
FIG. 3 is an enlarged schematic view of a portion around an opening illustrated in FIG. 1.

FIG. 3 is an enlarged schematic view of a portion around the unit opening illustrated in FIG. 1. As illustrated in FIG. 3, first, in a case where the reflection member 6 is not provided on the outer peripheral surface of the edge part (see FIG. 2) which surrounds the unit opening 4, a luminance-reduced area 14, in which luminance is reduced, is formed in a region on the liquid crystal panel 20 which region is on a side opposite to the light source 2 with respect to the unit opening 4 (see FIG. 1). Meanwhile, in a case where the reflection member 6 is provided on the outer peripheral surface of the edge part 3 which surrounds the unit opening 4, scattered light which has been scattered by the edge part 3 is reflected by the reflection member 6, so that a bright part 13 is formed in a region on the liquid crystal panel 20 which region is on a luminance-reduced area 14 side with respect to the unit opening 4.

Thus, according to Embodiment 1, the reflection member 6 reflects scattered light so as to allow the scattered light to enter an end surface of the light guide plate 11 from a reflection member 6 side. This allows reducing luminance unevenness around the unit opening 4, i.e., around the non-display region. By adopting this configuration, it is possible to reduce luminance unevenness around the non-display region even in a case where the unit opening 4 is provided in a given position.

Note that the above description of Embodiment 1 has discussed a liquid crystal display device which has an opening with a specific shape, but the unit opening is not limited to the shape presented in Embodiment 1. Thus, when viewed from above, for example, a shape of the unit opening can be an elliptical shape, a polygonal shape such as a square or a rectangle, or a shape including a curved portion.

Further, although a single unit opening is provided in Embodiment 1, the number of unit openings is not limited and can be more than one.

Further, in Embodiment 1, the liquid crystal display device can have a configuration which is different to the one described above. The following description will discuss modified examples of the liquid crystal display device. For easy explanation, the same reference signs will be given to members having the same function as a member described in Embodiment 1, and descriptions on such a member will be omitted.

Modified Example A

Figure 4:
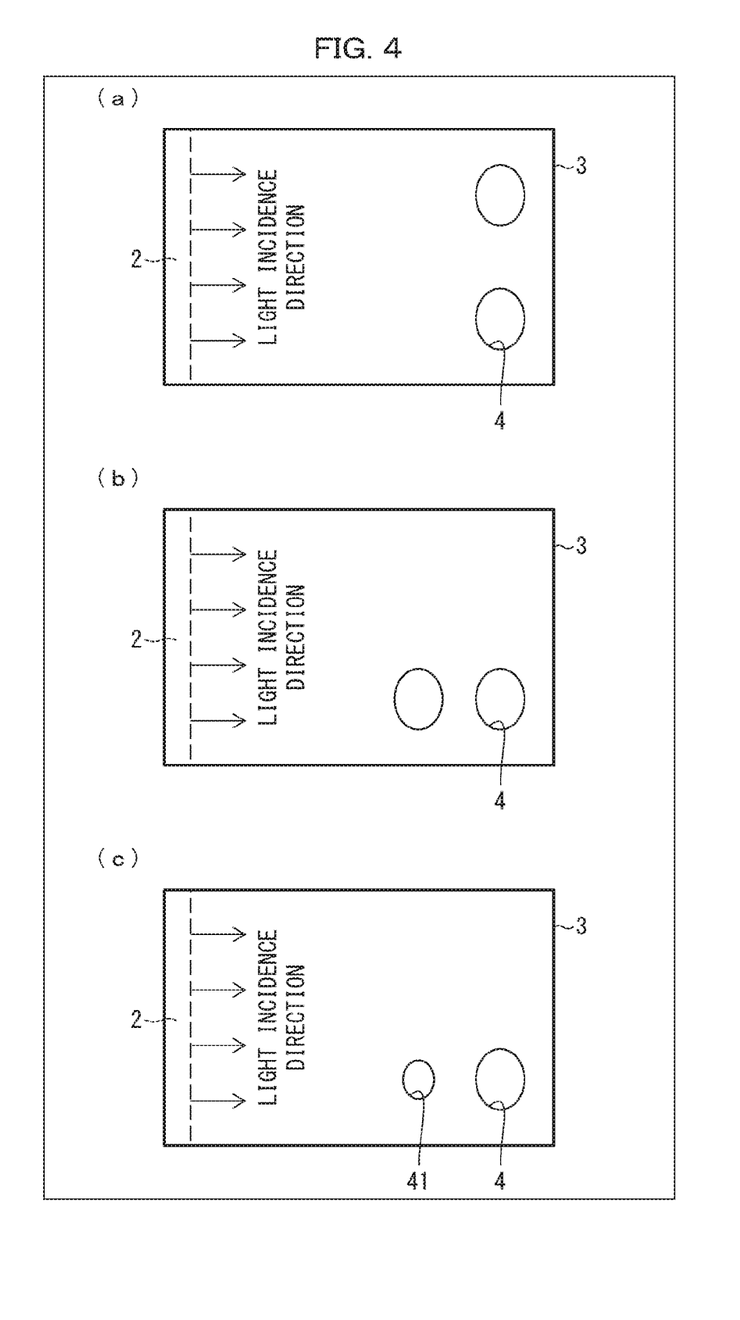
FIG. 4 is a top view schematically illustrating liquid crystal display devices in accordance with Modified Example A of Embodiment 1 of the present invention.

FIG. 4 is a top view schematically illustrating liquid crystal display devices in accordance with Modified Example A of Embodiment 1 of the present invention. (a) through (c) of FIG. 4 respectively illustrate first through third modified examples.

Firstly, as illustrated in (a) of FIG. 4, unit openings 4 which are identical in shape may be arranged in a row along a shorter dimension direction of a liquid crystal display device in the first modified example. Alternatively, as illustrated in (b) of FIG. 4, unit openings 4 which are identical in shape may be arranged in a row along a longer dimension direction of a liquid crystal display device in the second modified example. Further, as illustrated in (c) of FIG. 4, a unit opening 4 and a unit opening 41, which has a diameter different from that of the unit opening 4, may be arranged in a row along a longer dimension direction of a liquid crystal display device in the third modified example. The liquid crystal display devices presented in the first through third modified examples also achieves an advantageous effect similar to that of Embodiment 1.

Modified Example B

Figure 5:
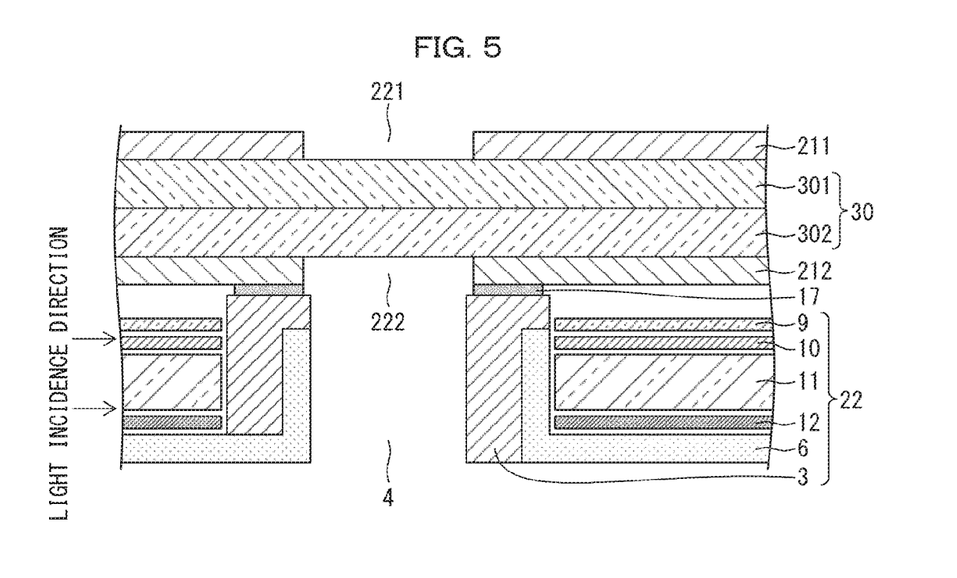
FIG. 5 is a cross-sectional view of a liquid crystal display device in accordance with Modified Example B of Embodiment 1 of the present invention.

The following description will discuss, with reference to FIG. 5, a modified example of the liquid crystal panel. FIG. 5 is a cross-sectional view of a liquid crystal display device in accordance with Modified Example B of Embodiment 1 of the present invention. As illustrated in FIG. 5, the liquid crystal display device in accordance with Modified Example B is configured such that a liquid crystal panel 30 is constituted by CF glass 301 and TFT glass 302. The liquid crystal panel 30 does not have an opening corresponding to a non-display region. Except for this point, the configuration of the liquid crystal display device in accordance with Modified Example B is similar to that of the liquid crystal display device illustrated in FIG. 2, and descriptions of the configuration will be omitted.

The liquid crystal display device having the above-described configuration also achieves an advantageous effect similar to that of Embodiment 1. Note that, although not illustrated, for example, a transparent material such as a color filter may be provided in a position corresponding to the non-display region of the liquid crystal panel.

Embodiment 2

Figure 6:
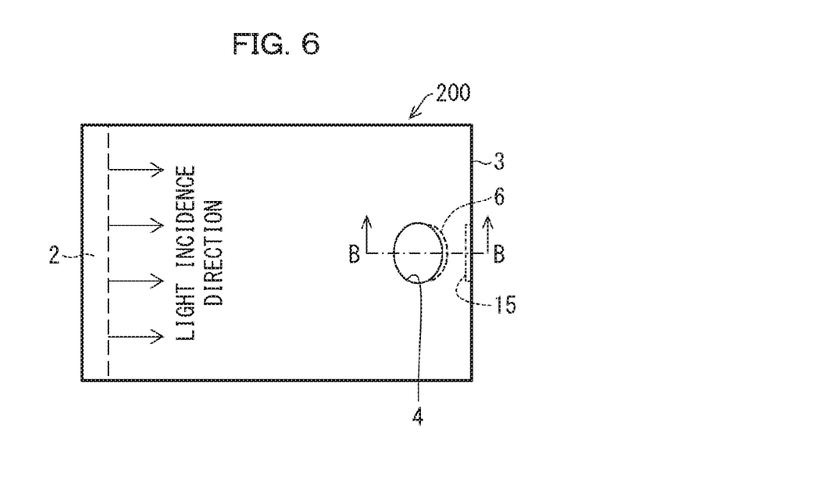
FIG. 6 is a top view schematically illustrating a liquid crystal display device in accordance with Embodiment 2 of the present invention.
Figure 7:
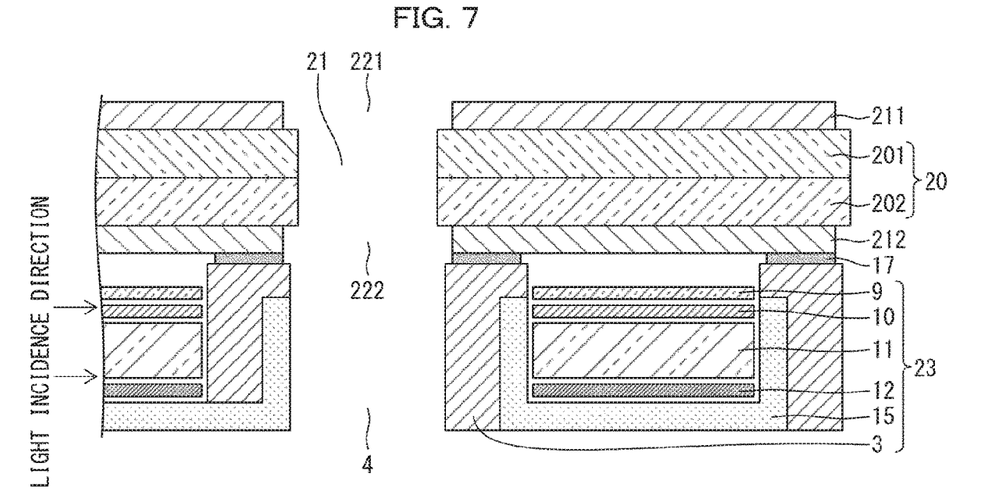
FIG. 7 is a cross-sectional view taken along a line B-B shown in FIG. 6.

The following description will discuss Embodiment 2 of the present invention in detail with reference to FIGS. 6 and 7. For easy explanation, the same reference signs will be given to members having the same function as a member described in Embodiment 1, and descriptions on such a member will be omitted.

FIG. 6 is a top view schematically illustrating a liquid crystal display device in accordance with Embodiment 2 of the present invention. FIG. 7 is a cross-sectional view taken along a line B-B shown in FIG. 6.

As illustrated in FIGS. 6 and 7, a liquid crystal display device 200 in accordance with Embodiment 2 has the configuration of the liquid crystal display device 100 illustrated in FIG. 1, and additionally includes a sub-reflection member 15 which is provided on a portion of an inner peripheral surface of an edge part 3 surrounding an outer periphery of a backlight unit which portion is on a side opposite to a light source 2. The sub-reflection member 15 reflects light from the light source 2. This allows further reducing luminance unevenness around a non-display region by utilizing reflection by the sub-reflection member 15. Further, the liquid crystal display device 200 may be modified as follows.

Modified Example C

Figure 8:
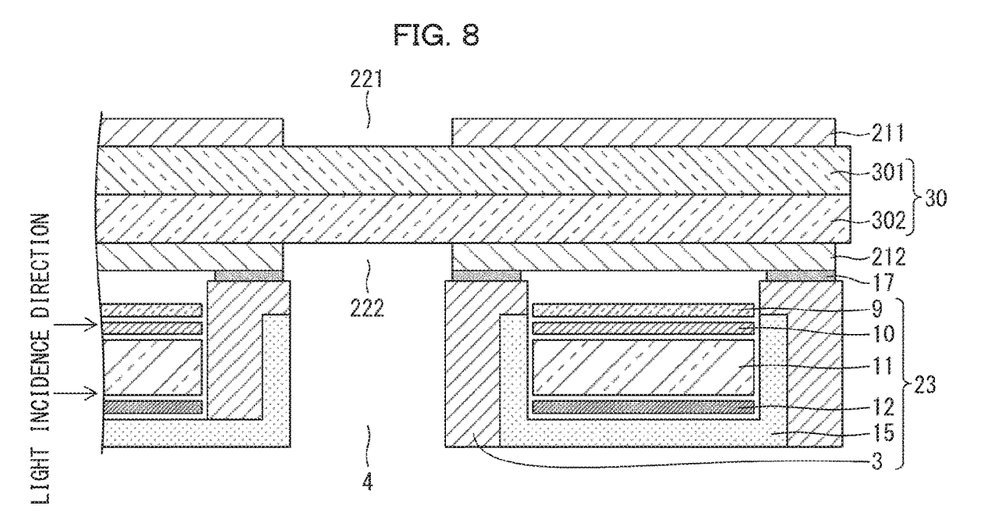
FIG. 8 is a cross-sectional view of a liquid crystal display device in accordance with Modified Example C of Embodiment 2 of the present invention.

FIG. 8 is a cross-sectional view of a liquid crystal display device in accordance with Modified Example C of Embodiment 2. As illustrated in FIG. 8, the liquid crystal display device in accordance with Modified Example C is configured such that a liquid crystal panel 30 does not have a panel opening corresponding to a non-display region. Except for this point, the configuration of the liquid crystal display device in accordance with Modified Example C is similar to that of the liquid crystal display device illustrated in FIG. 7, and descriptions of the configuration will be omitted. The liquid crystal display device having the above-described configuration also achieves an advantageous effect similar to that of Embodiment 2.

Modified Example D

Figure 9:
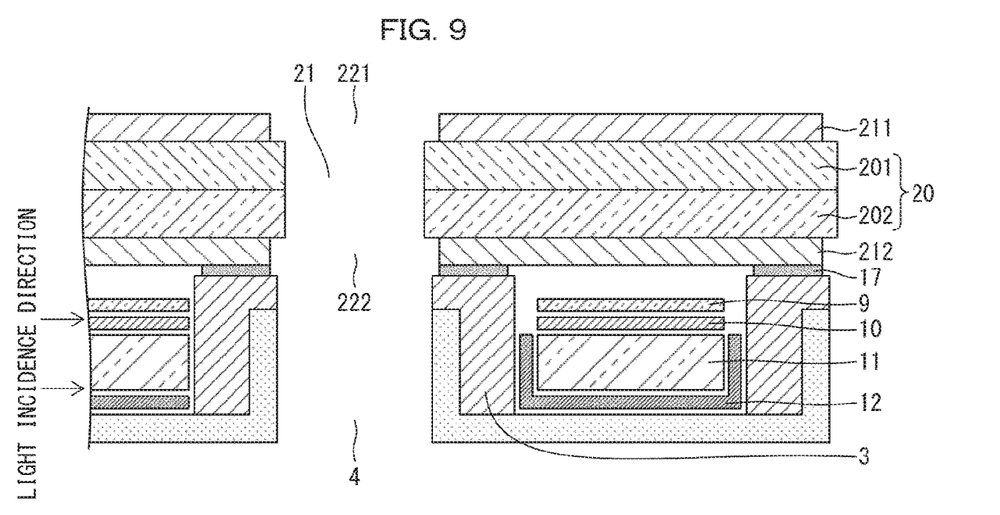
FIG. 9 is a cross-sectional view of a liquid crystal display device in accordance with Modified Example D of Embodiment 2 of the present invention.

FIG. 9 is a cross-sectional view of a liquid crystal display device in accordance with Modified Example D of Embodiment 2. As illustrated in FIG. 9, the liquid crystal display device in accordance with Modified Example D is configured such that both end portions of the reflection sheet 12 are each bent so as to have a substantially L shape in a cross section. The reflection sheet 12 thus bent is used as the reflection member and the sub-reflection member illustrated in FIG. 7. By adopting this configuration, it is possible to provide a display device which has a reduced number of components and is thus compact.

Modified Example E

Figure 10:
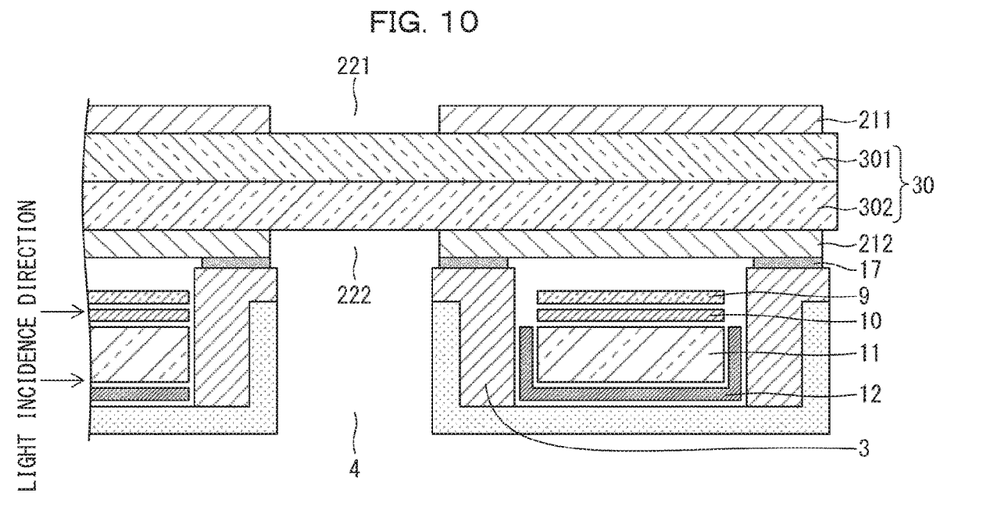
FIG. 10 is a cross-sectional view of a liquid crystal display device in accordance with Modified Example E of Embodiment 2 of the present invention.

FIG. 10 is a cross-sectional view of a liquid crystal display device in accordance with Modified Example E of Embodiment 2. As illustrated in FIG. 10, the liquid crystal display device in accordance with Modified Example C is configured such that a liquid crystal panel 30 does not have a panel opening corresponding to a non-display region. Except for this point, the configuration of the liquid crystal display device in accordance with Modified Example C is similar to that of the liquid crystal display device illustrated in FIG. 9, and descriptions of the configuration will be omitted. The liquid crystal display device having the above-described configuration achieves an advantageous effect similar to that of Embodiment 2.

Embodiment 3

Figure 11:
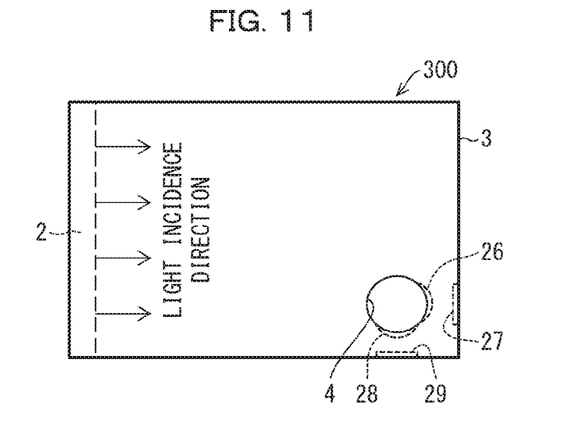
FIG. 11 is a top view schematically illustrating a liquid crystal display device in accordance with Embodiment 3 of the present invention.
Figure 12:
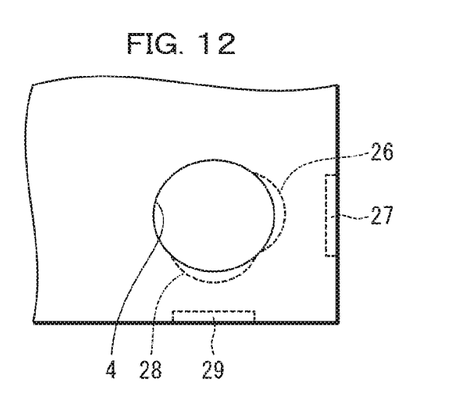
FIG. 12 is an enlarged schematic view of a portion around an opening illustrated in FIG. 11.

The following description will discuss Embodiment 3 of the present invention with reference to FIGS. 11 and 12. FIG. 11 is a top view schematically illustrating a liquid crystal display device in accordance with Embodiment 3 of the present invention. FIG. 12 is an enlarged schematic view of a portion around an opening illustrated in FIG. 11.

As illustrated in FIGS. 11 and 12, a liquid crystal display device 300 has a configuration which is similar to that of the liquid crystal display device 200 illustrated in FIG. 6 and in which a first reflection member 26 and a second reflection member 28 are provided on an outer peripheral surface of an edge part 3 which surrounds a unit opening 4. Further, on an inner peripheral surface of an edge part 3 which surrounds an outer periphery of a backlight unit, a first sub-reflection member 27 is provided in a position facing the first reflection member 26, and a second sub-reflection member 29 is provided in a position facing the second reflection member 28. By thus providing a plurality of sets each consisting of a sub-reflection member and a reflection member facing the sub-reflection member, a greater amount of reflected light can be used. This allows further reducing luminance unevenness around a non-display region.

Embodiment 4

Figure 13:
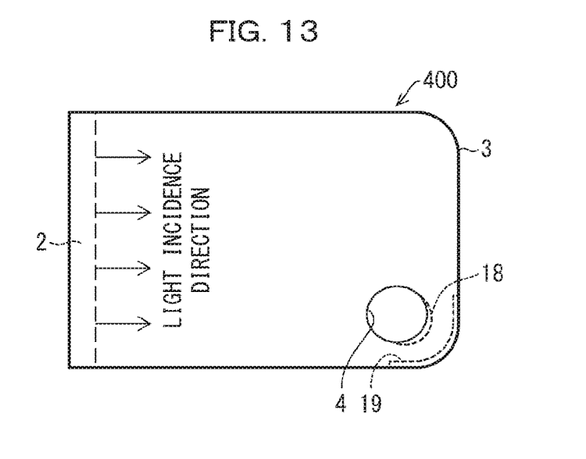
FIG. 13 is a top view schematically illustrating a liquid crystal display device in accordance with Embodiment 4 of the present invention.

The following description will discuss Embodiment 4 of the present invention with reference to FIG. 13. FIG. 13 is a top view schematically illustrating a liquid crystal display device in accordance with Embodiment 4 of the present invention.

As illustrated in FIG. 13, a liquid crystal display device 400 is configured such that a corner of a liquid crystal panel has a round shape similar to a round shape of a hole of the unit opening 4. Further, a sub-reflection member 19 has a shape which is in conformity with an outer shape of a reflection member 18. This configuration enables efficient use of light reflected by the sub-reflection member 19, and accordingly allows further reducing luminance unevenness around a non-display region.

[Recap]

A liquid crystal display device in accordance with Aspect 1 of the present invention is a display device including: a liquid crystal panel (a display section) 20 including a non-display region; and a backlight unit 22 having a unit opening 4 corresponding to the non-display region, the backlight unit 22 including: a light guide plate; a light source 2 provided on an end surface of the light guide plate; and edge parts 3 respectively surrounding (i) an outer periphery of the backlight unit 22 and (ii) the unit opening 4, a reflection member 6 being provided on a portion of an outer peripheral surface of the edge part 3 surrounding the unit opening 4 which portion is on a side opposite to the light source 2, the reflection member 6 reflecting scattered light which has been scattered by the edge part 3.

According to the above configuration, the reflection member 6 reflects scattered light, and the scattered light thus reflected enters an end surface of the light guide plate 11 from a reflection member 6 side so as to propagate through the light guide plate 11 and then exit the light guide plate 11 from an exit plane side. This allows reducing luminance unevenness around the non-display region even in a case where the unit opening 4 is provided in a given position.

In Aspect 2 of the present invention, the display device in accordance with Aspect 1 is preferably configured such that the reflection member 6 has a reflectance higher than that of each of the edge parts 3.

In Aspect 3 of the present invention, the display device in accordance with Aspect 1 or 2 is preferably configured such that a sub-reflection member is provided on an inner peripheral surface of the edge part surrounding the outer periphery of the backlight unit, the sub-reflection member reflecting light from the light source.

The above configuration allows further reducing luminance unevenness around the non-display region by using light reflected by the sub-reflection member.

In Aspect 4 of the present invention, the display device in accordance with Aspect 3 is preferably configured such that the sub-reflection member faces the reflection member.

In Aspect 5 of the present invention, the display device in accordance with Aspect 4 is preferably configured such that the display device includes a plurality of sets each consisting of the sub-reflection member and the reflection member facing the sub-reflection member.

The above configuration allows further reducing luminance unevenness around the non-display region by using a greater amount of reflected light.

In Aspect 6 of the present invention, the display device in accordance with any one of Aspects 3 through 5 is preferably configured such that the sub-reflection member has a shape which is in conformity with an outer shape of the reflection member.

The above configuration allows further reducing luminance unevenness around the non-display region by efficiently using light reflected by the reflection member.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

2: light source
3: edge part
4, 41: unit opening
6: reflection member
11: light guide plate
15: sub-reflection member
20: liquid crystal panel (display section)
22: backlight unit
26: first reflection member
27: first sub-reflection member
28: second reflection member
29: second sub-reflection member
100, 200, 300, 400: liquid crystal display device (display device)

The invention claimed is:

1. A display device comprising:
a display section including a non-display region; and
a backlight unit having an opening corresponding to the non-display region,
the backlight unit including:
a light guide plate;
a light source provided on an end surface of the light guide plate;
edge portions respectively surrounding (i) an outer periphery of the backlight unit and (ii) the opening; and
a reflection member being provided only on a first portion of an outer peripheral surface of the edge portion surrounding the opening, the first portion being on a side opposite to the light source, the reflection member reflecting scattered light which has been scattered by the edge portion surrounding the opening, wherein
the reflection member has a reflectance higher than that of a second portion of the outer peripheral surface of the edge portion surrounding the opening, the second portion being on a side toward the light source.

2. The display device as set forth in claim 1, wherein a sub-reflection member is provided on an inner peripheral surface of the edge portion surrounding the outer periphery of the backlight unit, the sub-reflection member reflecting light from the light source.

3. The display device as set forth in claim 2, wherein the sub-reflection member opposes the reflection member.

4. The display device as set forth in claim 3, further comprising a plurality of sets, each of the plurality of sets including the sub-reflection member and the reflection member opposing the sub-reflection member.

5. The display device as set forth in claim 2, wherein the sub-reflection member has a shape which is in conformity with an outer shape of the reflection member.

* * * * *